(12) United States Patent
Kim et al.

(10) Patent No.: US 9,913,267 B2
(45) Date of Patent: *Mar. 6, 2018

(54) METHOD OF REFERENCE SIGNALING RESOURCE ALLOCATION FOR CONTROL CHANNEL TRANSMISSION IN WIRELESS COMMUNICATION SYSTEM

(71) Applicant: Samsung Electronics Co., Ltd., Suwon-si, Gyeonggi-do (KR)

(72) Inventors: Younsun Kim, Seongnam-si (KR); Cheng Shan, Suwon-si (KR); Kiil Kim, Yongin-si (KR); Hyojin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

This patent is subject to a terminal disclaimer.

(21) Appl. No.: 14/859,930

(22) Filed: Sep. 21, 2015

(65) Prior Publication Data

US 2016/0014732 A1 Jan. 14, 2016

Related U.S. Application Data

(63) Continuation of application No. 13/676,643, filed on Nov. 14, 2012, now Pat. No. 9,167,572.

(Continued)

(51) Int. Cl.
H04W 72/04 (2009.01)
H04L 5/00 (2006.01)

(52) U.S. Cl.
CPC ......... *H04W 72/042* (2013.01); *H04L 5/0007* (2013.01); *H04L 5/0023* (2013.01);
(Continued)

(58) Field of Classification Search
None
See application file for complete search history.

(56) References Cited

U.S. PATENT DOCUMENTS 7,733,827 B2 6/2010 Kim et al.
8,229,446 B2 7/2012 Shin et al.
(Continued)

FOREIGN PATENT DOCUMENTS

EP 2 378 703 A1 10/2011
KR 10-2011-0084976 A 7/2011
(Continued)

OTHER PUBLICATIONS

3GPP TSG-RAN1 #55bis, Control Channel Design for the Support of Wider Bandwidth for LTE-Advanced, R1-090157, Jan. 12-16, 2009, Ljubljana, Slovenia.
(Continued)

*Primary Examiner* — Candal Elpenord
(74) *Attorney, Agent, or Firm* — Jefferson IP Law, LLP

(57) ABSTRACT

In legacy systems such as $3^{rd}$ Generation Partnership Project (3GPP) releases 8 to 10, the control channel is transmitted using the first few Orthogonal Frequency Division Multiplexing (OFDM) symbols in a subframe. The limited control channel capacity will impact the system performance in future releases as more and more User Equipments (UEs) will be scheduled in a subframe with technologies such as MulitUser-Multiple Input Multiple Output (MU-MIMO) and Coordinated Multipoint (CoMP) transmission being enhanced or introduced. A new Enhanced Control CHannel (E-CCH) is necessary to be designed, which will use the resource in the Physical Downlink Shared CHannel (PDSCH) in the legacy systems. The E-CCH will support UE-specific DeModulation Reference Signal (DMRS) based transmission and receiving. However, the configuration of DMRS for E-CCH is necessary to be known to UE in prior.

(Continued)

DMRS port configuration for Agg. Lv. 1&2

DMRS port configuration for Agg. Lv. 4&8

▨ DMRS port 7~8   ▩ DMRS port 9~10   ▨ Punctured REs for E-CCH

This invention discloses multiple methods in which DMRS is configured for E-CCHs and respective eNB and UE behaviors.

24 Claims, 12 Drawing Sheets

Related U.S. Application Data

(60) Provisional application No. 61/559,263, filed on Nov. 14, 2011, provisional application No. 61/562,074, filed on Nov. 21, 2011.

(52) U.S. Cl.
CPC .......... *H04L 5/0048* (2013.01); *H04L 5/0051* (2013.01); *H04L 5/0053* (2013.01); *H04L 5/0091* (2013.01); *H04W 72/0446* (2013.01)

(56) References Cited

U.S. PATENT DOCUMENTS

| | | |
|---|---|---|
| 2009/0201863 A1 | 8/2009 | Pi |
| 2010/0120424 A1 | 5/2010 | Johansson et al. |
| 2010/0232388 A1 | 9/2010 | Nakao et al. |
| 2010/0279628 A1 | 11/2010 | Love et al. |
| 2010/0316146 A1 | 12/2010 | McBeath et al. |
| 2011/0019776 A1 | 1/2011 | Zhang et al. |
| 2011/0249633 A1 | 10/2011 | Hong et al. |
| 2011/0269492 A1 | 11/2011 | Wang |
| 2012/0082022 A1 | 4/2012 | Damnjanovic et al. |
| 2012/0250642 A1* | 10/2012 | Qu .................... H04W 48/12 370/329 |
| 2013/0044664 A1 | 2/2013 | Nory et al. |
| 2013/0044727 A1 | 2/2013 | Nory et al. |
| 2013/0064216 A1* | 3/2013 | Gao .................... H04W 72/04 370/330 |

FOREIGN PATENT DOCUMENTS

| | | |
|---|---|---|
| KR | 10-2011-0112750 A | 10/2011 |
| WO | 2011/090688 A2 | 7/2011 |

OTHER PUBLICATIONS

3GPP TSG-RAN1#65 meeting, Discussion on Downlink Control Channel Enhancement, R1-111471, May 9-13, 2011, Barcelona, Spain.
Renesas Mobile Europe LTD.; E-PDCCH design aspects; 3GPP TSG-RAN WG1 Meeting #66bis; R1-113174; 3rd Generation Partnership Project (3GPP); XP050538301; Oct. 4, 2011; Zhuhai, CN.
Interdigital Communications, LLC; Consideration on Reference Signal for E-PDCCH; 3GPP TSG RAN WG1 Meeting #67; R1-113932, 3rd Generation Partnership Project (3GPP), XP050562280; Nov. 9, 2011; San Francisco, CA.

* cited by examiner

FIG. 6
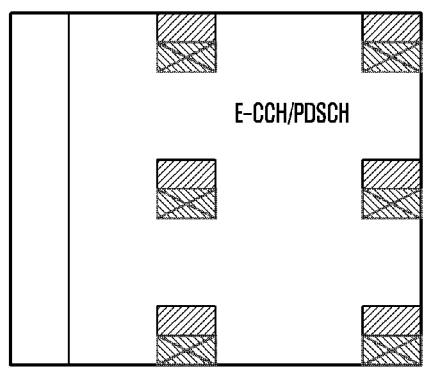
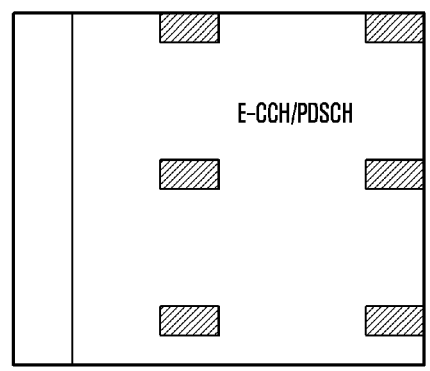
DMRS port configuration for Agg. Lv. 1&2    DMRS port configuration for Agg. Lv. 4&8
 DMRS port 7~8     DMRS port 9~10     Punctured REs for E-CCH FIG. 7
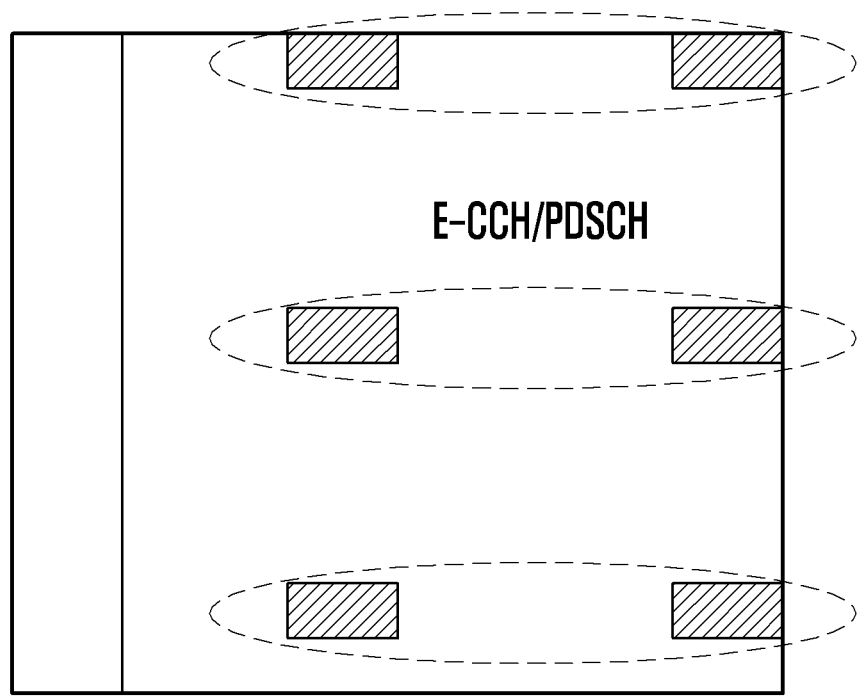
DMRS port configuration for all Agg. Lvs.
 DMRS port 7,8,11,12

METHOD OF REFERENCE SIGNALING RESOURCE ALLOCATION FOR CONTROL CHANNEL TRANSMISSION IN WIRELESS COMMUNICATION SYSTEM

CROSS-REFERENCE TO RELATED APPLICATIONS

This application is a continuation application of prior application Ser. No. 13/676,643, filed on Nov. 14, 2012, which claimed the benefit under 35 U.S.C. § 119(e) of a U.S. Provisional application filed on Nov. 14, 2011 in the U.S. Patent and Trademark Office and assigned Ser. No. 61/559,263, and a U.S. Provisional application filed on Nov. 21, 2011 in the U.S. Patent and Trademark Office and assigned Ser. No. 61/562,074, the entire disclosure of each of which is hereby incorporated by reference.

BACKGROUND OF THE INVENTION

1. Field of the Invention

The present invention relates to a wireless cellular communication system with at least one enhanced Node B (eNB) and at least one User Equipment (UE). More particularly, the present invention relates to a wireless communication system in which multiple physical antennas are represented by logical antenna ports in reference signals.

Throughout the following description of exemplary embodiments of the present invention, the 3$^{rd}$ Generation Partnership Project (3GPP) Long Term Evolution (LTE) Release 8-10 is regarded as a legacy system whereas the in-development Release 11 and future releases are considered to be systems in which exemplary embodiments of the present invention can be implemented. However, this is not intended to be a limitation of the invention or its application and it is to be understood that the current invention can also be applied to other cellular systems where appropriate.

2. Description of the Related Art

Generally, mobile communication systems have been developed to provide a voice communication service to users on the move. As time has progressed, mobile communication systems have evolved to support data communication services as well as standard voice communication services, and can now also support high speed data communication services. However, there is a need for more sophisticated mobile communication systems to mitigate resource shortages and to meet the high-speed service requirements of users.

The LTE system is a next generation broadband communication technology developed by the 3GPP in order to meet such requirements. The LTE system is a technology for realizing high-speed packet-based communication at up to 100 Mbps. To achieve these requirements, discussions are being held on various aspects. For example, discussions are being held regarding one scheme for reducing the number of nodes located in a communication path by simplifying a configuration of the network, and another scheme for maximally approximating wireless protocols to wireless channels.

In the aforementioned LTE wireless communication system, at least two kinds of reference signals are defined.

The first kind of reference signal is referred to as a Common Reference Signal (CRS). CRS is cell specific, and all the UEs connecting to the eNB can use CRS for demodulation when CRS-based transmission is configured.

The second kind of reference signal is referred to as a DeModulation Reference Signal (DMRS). DMRS is UE specific. That is, the UE will use the DMRS within its allocated resources for demodulation of the said allocation resources, where the DMRS and the data are precoded with the same weights among antenna ports.

The control channel is usually transmitted in the beginning of a sub-frame in order that the UE can efficiently acquire the scheduling information as quickly as possible. Considering the 3GPP LTE as an example, the Physical Downlink Control CHannel (PDCCH) is configured to be transmitted in the first one to four Orthogonal Frequency Division Multiplexing (OFDM) symbols in a sub-frame.

FIG. 1 illustrates a subframe structure with 2-OFDM-symbol PDCCH and DMRS with ports 7~14 configured according to the related art.

Referring to FIG. 1, the ports 7~10 use a spreading factor of 2 to multiplex two DMRS ports on two consecutive Resource Elements (REs) in the time domain. Ports 11~14 use the same resource as ports 7~10 but use a spreading factor of 4 for to multiplex 4 DMRS ports on the four consecutive REs in a subcarrier.

To increase the capacity of the legacy PDCCH, the Enhanced Control CHannel (E-CCH) is proposed to be allocated in the legacy Physical Downlink Scheduling CHannel (PDSCH) region. DMRS based transmission should be supported for E-CCH since E-CCH should work for those special Multicast-Broadcast Single Frequency Network (MBSFN) subframes where CRS is absent. The E-CCH corresponds to Enhanced Physical Downlink Control CHannel (E-PDCCH) described in LTE standard specification.

In the legacy system, DMRS is used for decoding of PDSCH. The characteristics of the DMRS configurations, including the number of DMRS ports and scrambling sequence ID, are indicated to the UE using Downlink Control Information (DCI) in the PDCCH. However, if DMRS is used for E-CCH transmission, the DMRS configuration cannot be previously indicated by the control channel itself. Thus, a predefined configuration or implicit indication should be enabled for the UE to obtain DMRS configurations.

There are basically two kinds of E-CCH structures.

Interleaved mode: an Enhanced Control Channel Element (E-CCE) contains REs distributed in multiple Resource Blocks (RBs);

Localized mode: an E-CCE contains REs within one RB

Exemplary embodiments of the present invention focus on the case of E-CCH with localized E-CCE distribution.

FIG. 2 illustrates an E-CCE localized structure in an RB, where 4 E-CCEs are allocated in one Physical Resource Block (PRB) in a subframe, according to the related art.

Referring to FIG. 2, a logical E-CCE can contain a set of either consecutive or distributed physical REs in the RB. FIG. 2 also illustrates a physical structure, where an E-CCE consists of REs in three distributed subcarriers, according to the related art. The allocated REs for E-CCH exclude those REs allocated for legacy PDCCH, and any type of reference signals when configured.

Therefore, a need exists for methods of allocation of DMRS resources and implicit indication of DMRS configuration for E-CCH transmission.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide methods to implicitly indicate the DeModulation Reference Signal (DMRS) configuration to a User Equipment (UE) for Enhanced Control CHannel (E-CCH) transmission.

In accordance with an aspect of the present invention, a system is provided. The system allocates a DMRS resource according to the resource size allocated for E-CCH transmission. For example, when multiple E-CCHs are multiplexed in one Resource Block (RB), four DMRS ports should be configured. And when only one E-CCH is scheduled in one RB, the system should only configure two DMRS ports for resource saving. After the DMRS ports are configured, the system can either perform rate matching or puncturing around the DMRS Resource Elements (REs) when mapping the E-CCH payload to REs, according to particular exemplary embodiments.

In accordance with an aspect of the present invention, a method for receiving a control channel by a user equipment in a wireless communication system is provided. The method comprises receiving configuration information of the control channel from a base station, identifying an aggregation level of the control channel transmitted from the base station, determining a size of a resource allocated to the control channel depending on the identified aggregation level, and decoding subframes received from the base station depending on results of the determination.

In accordance with another aspect of the present invention, a UE for receiving a control channel from a base station in a wireless communication system is provided. The UE comprises a communication unit configured to transmit or receive a signal to or from the base station, and a control unit configured to receive configuration information about the control channel from the base station, to identify an aggregation level of the control channel, to determine a size of a resource allocated to the control channel depending on the identified aggregation level, and to decode subframes received from the base station depending on results of the determination.

In accordance with yet another aspect of the present invention, a method for transmitting a control channel by a base station in a wireless communication system of is provided. The method includes transmitting configuration information of the control channel for the user equipment to the user equipment, generating a control channel that includes control information related to the user equipment scheduled in any subframe, identifying an aggregation level of the generated control channel and determining resources for DMRS depending on the identified aggregation level, and transmitting the control channel through the determined resources to the user equipment.

In accordance with still another aspect of the present invention, a base station for transmitting a control channel in a wireless communication system is provided. The Base Station includes a communication unit configured to transmit or receive a signal to or from user equipment, and a control unit configured to transmit configuration information of the control channel for the user equipment to the user equipment, to generate the control channel that includes control information related to the user equipment scheduled in any subframe, to identify an aggregation level of the generated control channel, to determine resources for DMRS depending on the identified aggregation level, and to transmit the control channel through the determined resources to the user equipment.

According to an exemplary implementation of the present invention, the base station can implicitly indicate the DMRS configuration to the UE, and the UE can determine a size and region of the control channel allocated to itself without separate signaling. Accordingly, it is possible for the wireless communication system to use limited resources efficiently and reduce the load.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 is an illustration of DMRS configuration and E-CCE mapping of method 2 according to an exemplary embodiment of the present invention.

FIG. 7 is an illustration of DMRS configuration and E-CCE mapping of method 3 according to an exemplary embodiment of the present invention.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention focus on a scenario that a DeModulation Reference Signal (DMRS) is used for Enhanced Control CHannel (E-CCH) transmission. E-CCH is transmitted on n number of E-CCHs. Namely, an Enhanced Control Channel Element (E-CCE) is a transmission unit of E-CCH. Here, n may have one value of 1, 2, 4 and 8 according to exemplary embodiments of the present invention.

Figure 1:
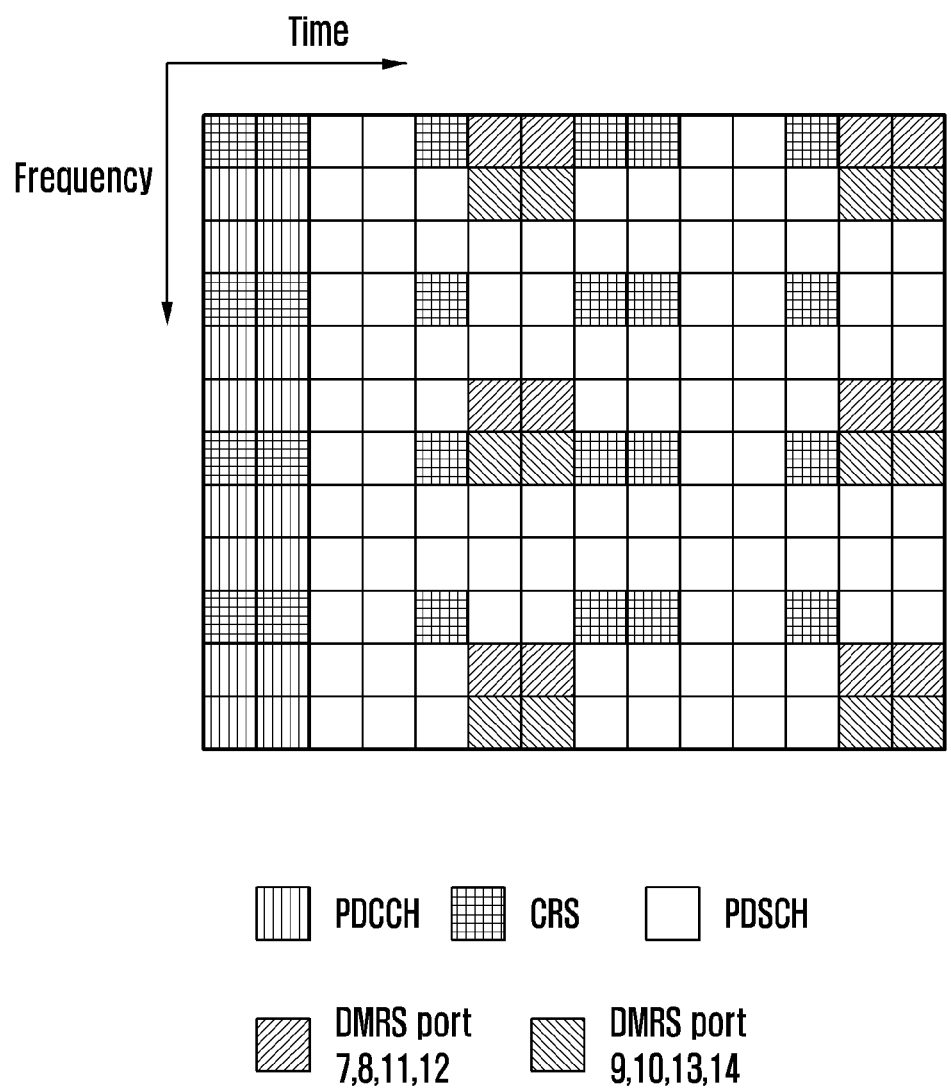
FIG. 1 illustrates a sub-frame structure with 2-OFDM-symbol Physical Downlink Control Channel (PDCCH) and DeModulation Reference Signal (DMRS) with ports 7~14 configured according to the related art.
Figure 2:
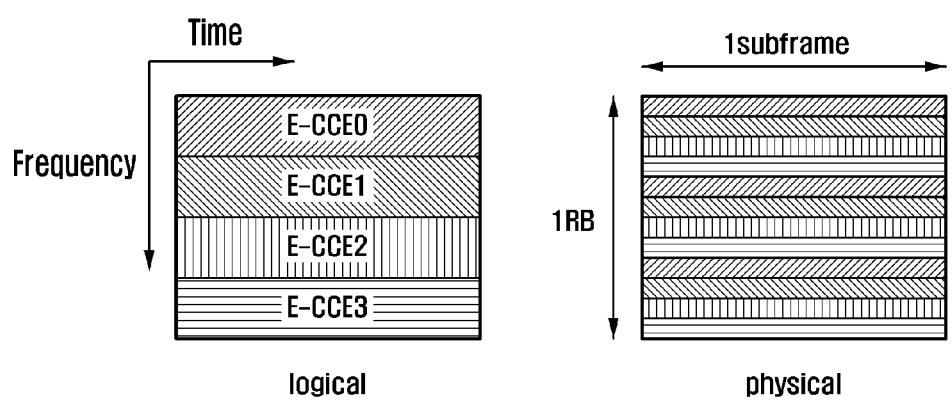
FIG. 2 is an illustration of Enhanced Control Channel Element (E-CCE) localized structure in a Resource Block (RB), where 4 E-CCEs are allocated in one Physical Resource Block (PRB) in a subframe, according to the related art.

A 4 E-CCE per Resource Block (RB) structure was illustrated in FIG. 2, where an RB consists of 4 logical E-CCEs. The E-CCE is the basic unit for E-CCH transmission. An E-CCH can use 1/2/4/8 E-CCEs for transmission. When aggregating E-CCEs in localized mode, the system aggregates those consecutive E-CCEs in the configured RB resources, so that the resulting E-CCH also consists of consecutive resources. When there are four E-CCEs in an RB, the E-CCH with 1, 2, 4, 8 aggregation levels will occupy ¼, ½, 1, 2 RBs respectively.

Figure 3:
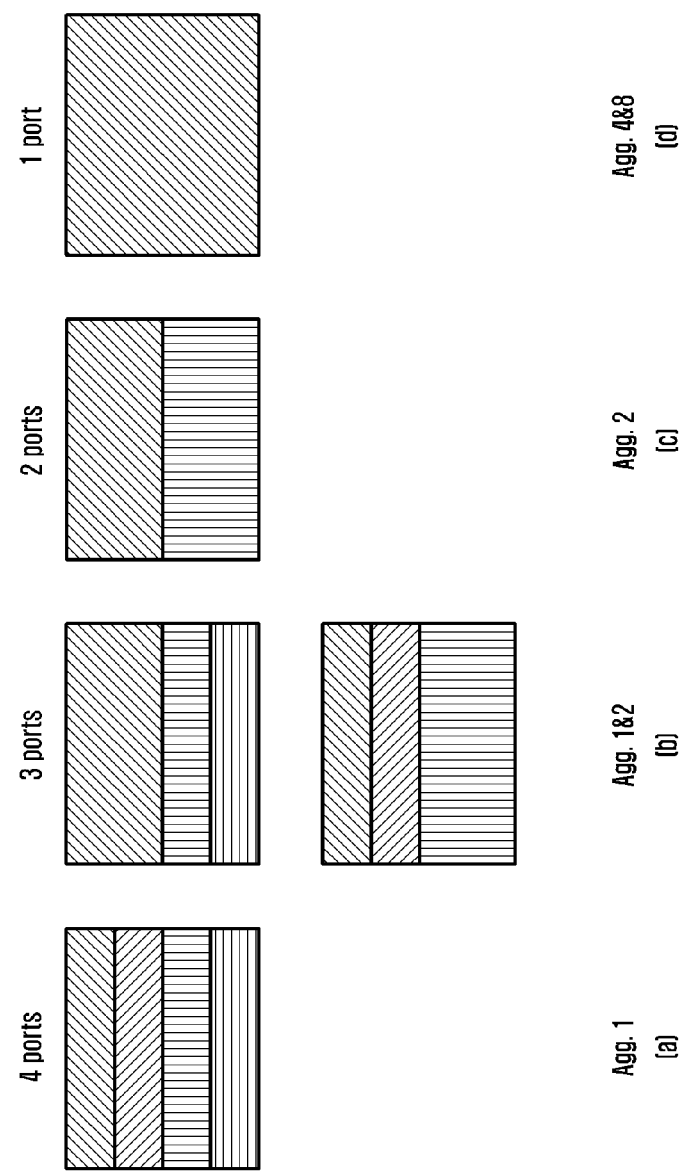
FIG. 3 is an illustration of the possible multiplexing of multiple Enhanced Control CHannels (E-CCHs) in an RB according to an exemplary embodiment of the present invention.

FIG. 3 is an illustration of the possible multiplexing of multiple E-CCHs in an RB according to an exemplary embodiment of the present invention.

Referring to FIG. 3, it is noted that an E-CCH with aggregation level one can start from any E-CCE index i, an E-CCH with aggregation level two can only start from any E-CCE index i with imod2=0, an E-CCH with aggregation level four can only start from any E-CCE index i with imod4=0, and an E-CCH with aggregation level eight can only start from any E-CCE index i with imod8=0. For simplicity, it is assumed that the E-CCH transmission is restricted with rank 1, and one DMRS port is necessary for each of the E-CCHs. In alternative exemplary implementations, it is also possible to higher rank transmission, e.g., rank 2, wherein two DMRS ports are necessary for each of the E-CCHs.

When an RB is multiplexed with four E-CCHs with aggregation level one, four DMRS ports are needed for each of the E-CCH. When an RB is multiplexed with three E-CCHs with aggregation levels one and two, three DMRS ports are needed for each of the E-CCH. When an RB is multiplexed with two E-CCHs with aggregation level two, two DMRS ports are needed for each of the E-CCH. When an RB is multiplexed with one E-CCH with aggregation level four or eight, one DMRS port is needed for the E-CCH.

It is further assumed that a User Equipment (UE) will receive indication as to which DMRS port is allocated for a certain E-CCH or search space. This indication could be explicitly configured by higher layer configuration, or implicitly indicated with other conditions, e.g., the DMRS port is related to the E-CCE index, or the starting E-CCE index of an E-CCH. Because the detailed indication method is beyond the scope of the present invention, it will not be treated further.

Exemplary Method 0: Maximum DMRS Port Configuration

Figure 4:
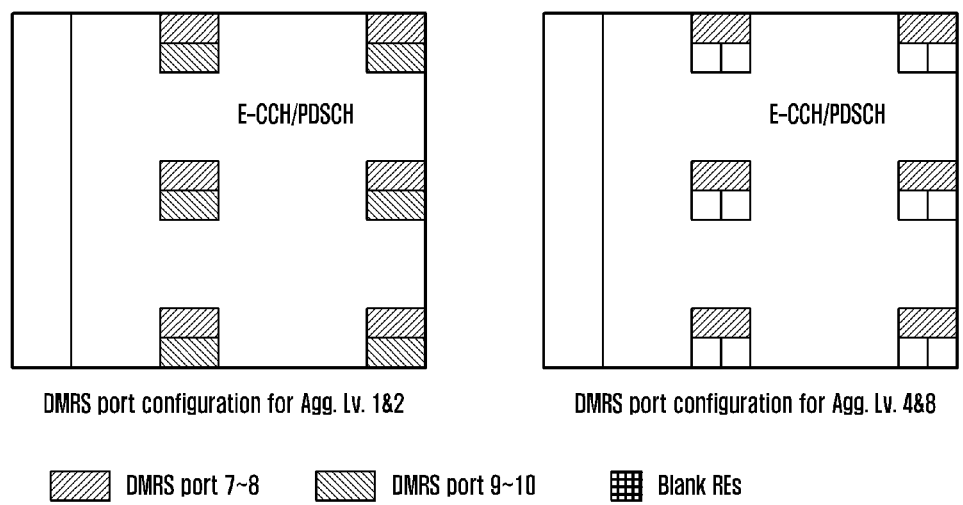
FIG. 4 is an illustration of DMRS configuration and E-CCE mapping of method 0 according to an exemplary embodiment of the present invention.

FIG. 4 is an illustration of DMRS configuration and E-CCE mapping of method 0 according to an exemplary embodiment of the present invention.

Referring to FIG. 4, in method 0, the system always configures 4 DMRS ports for any aggregation level of E-CCH. Although for aggregations four and eight, only one DMRS port is necessary, and the Resource Elements (REs) for DMRS ports 9~10 are still configured. When allocating E-CCH payload to the REs, those DMRS REs for ports 9~10 are left unused, or these REs are used for other purposes. At the UE side, the UE will always assume all the RBs carrying E-CCHs are configured with 4 DMRS ports, regardless of their actual aggregation levels. No E-CCH symbols are mapped onto those DMRS REs, regardless if they are used for DMRS, blank, or used for other purposes.

A benefit of method 0 is that it is simple for UE operation. However, it may have unused/wasted REs when two or less DMRS is needed.

Exemplary Method 1: DMRS Port Configurations Depending on Aggregation Levels

In an exemplary embodiment, the system will configure 4 DMRS port resources for those RBs with at least one E-CCH of aggregation level one or two, and configure 2 DMRS port resources for those RBs with aggregation level four or eight. Note that for the case when two E-CCHs with aggregation level two are multiplexed in one RB, only two DMRS ports are needed. However, when a UE detects an E-CCH with aggregation level two, it will have no knowledge if the remaining two E-CCEs in the same RB will be allocated as one E-CCH of aggregation level two, or two E-CCHs of aggregation level one. Thus, for the case of E-CCH of aggregation level two, 4 DMRS port REs are assumed.

At the UE side, the UE will first generate search spaces for each aggregation level. A search space is defined as a set of resources where an E-CCH for the particular UE can be transmitted. The amount of search space is limited for simplicity. The UE will try to decode each search space of every aggregation level. If the Cyclic Redundancy Check (CRC) of the decoded sequence passed, the UE will assume the decoding of the E-CCH is successful.

Based on the above-discussed description, an exemplary embodiment of the present invention will be now described.

First, the following description assumes that in any RB, four kinds of signals, E-CCH (or the Physical Downlink Scheduling CHannel (PDSCH), the same will apply hereinafter) of one UE, DMRS of one UE, E-CCH of another UE, and DMRS of another UE, are transmitted.

Figure 5:
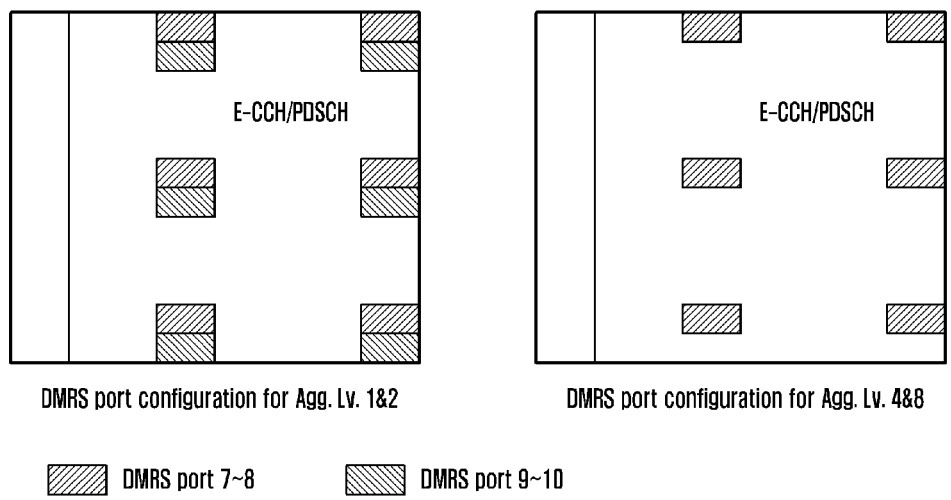
FIG. 5 is an illustration of DMRS configuration and E-CCE mapping of method 1 according to an exemplary embodiment of the present invention.

FIG. 5 is an illustration of DMRS configuration and E-CCE mapping of method 1 according to an exemplary embodiment of the present invention.

Referring to FIG. 5, resource or resources for one or more UEs may be allocated to one resource block, and resource allocating information is transmitted to the UE from the eNB through the E-CCH.

In this case, if the E-CCH with at least one of aggregation levels 1 and 2 is transmitted, the first UE, as illustrated in FIG. 3, recognizes that resource allocating information about another UE is contained in a corresponding resource block that transmits the E-CCH. Thus, if the DMRS for the first UE is transmitted through the DMRS ports 7~8 as illustrated in FIG. 5, the first UE assumes that the DMRS of the other UE is transmitted through the DMRS ports 9~10 illustrated in FIG. 5. This is because, as described above, if the aggregation level of the E-CCH is at least one of the aggregation levels 1 and 2, a resource of any UE other than the first UE may be allocated, and accordingly, the DMRS for the first UE and the other UE should be transmitted in a corresponding resource block.

As a consequence, the first UE assumes that if the aggregation level is at least one of aggregation levels 1 and 2, E-CCH is not transmitted at the region corresponding to DMRS ports 9~10. Namely, the first UE assumes that the E-CCH is transmitted on the rest of resources except resources corresponding to the DMRS ports 7~10.

Meanwhile, in the case of transmitting the E-CCH with the aggregation level 4 or 8, the first UE recognizes that, as illustrated in FIG. 3, the resource allocation information and data of the first UE itself, not of the other UE, are transmitted on the corresponding resource block. Thus, if the DMRS of the first UE is transmitted on the DMRS ports 7~8 as illustrated in FIG. 5, the first UE assumes that the E-CCH of the first UE, not the DMRS of the other UE, is transmitted on the region corresponding to the DMRS ports 9~10. This is because, as described above, in case where the aggregation level of E-CCH is either 4 or 8, only a resource of the first UE can be allocated in the corresponding resource block.

Consequentially, the first UE assumes that if the aggregation level is either 4 or 8, the E-CCH is transmitted on the region corresponding to the DMRS ports 9~10. Namely, the first UE assumes that the E-CCH is transmitted on the rest of resources except the region corresponding to the DMRS ports 7~8.

As discussed above, according to an exemplary embodiment of the present invention, the UE determines the size of resources depending on the aggregation level of the E-CCH, and performs the decoding process using the determined size of resources.

Figures 8A, 8B:
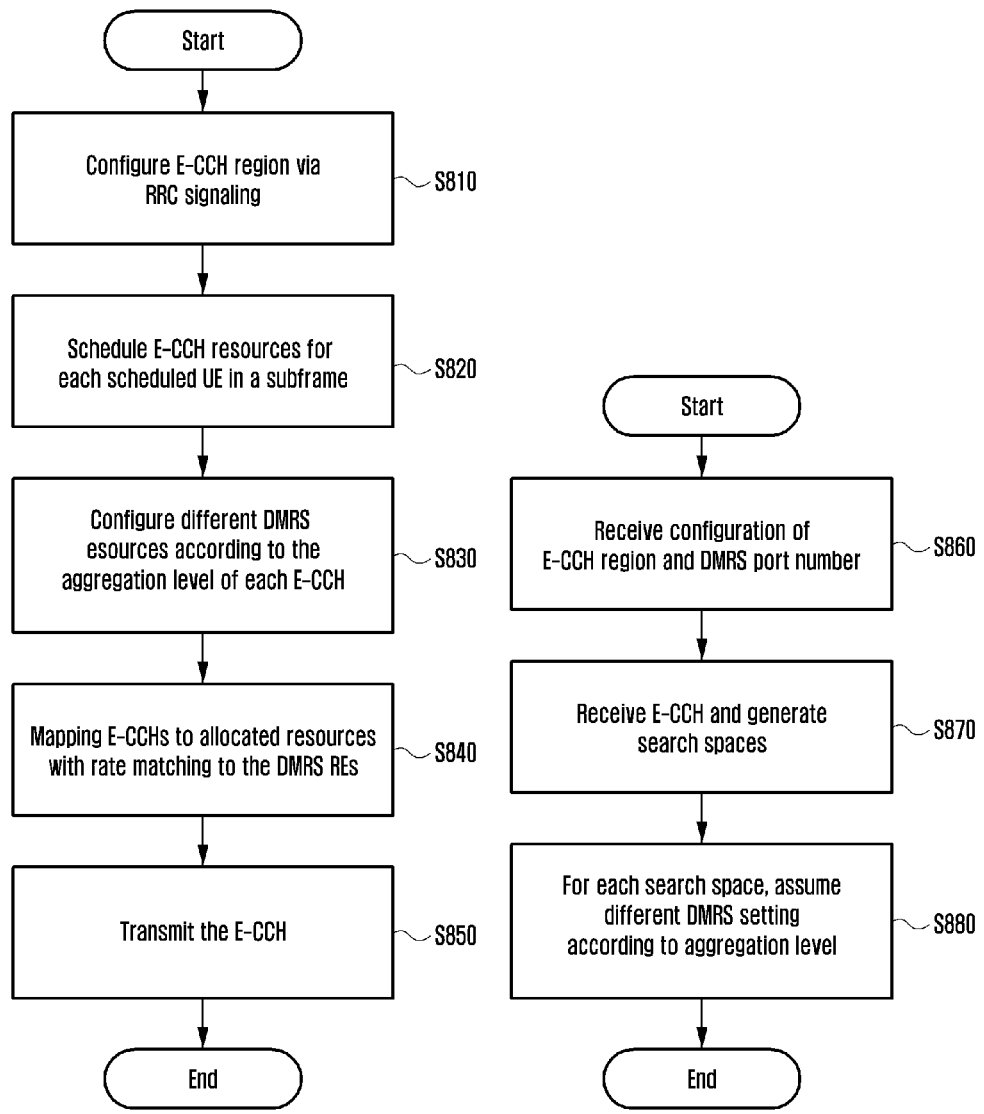
FIGS. 8A and 8B are illustrations of an enhanced Node B (eNB) and a UE's corresponding procedures of method 2 according to exemplary embodiments of the present invention.

FIGS. 8A and 8B are illustrations of an eNB's and a UE's corresponding procedures of method 2 according to exemplary embodiments of the present invention.

Referring to FIG. 8A, an eNB first configures the UE for its E-CCH configuration (configuration related to E-CCH region) in step S810. In an exemplary implementation, the configuration can be part of higher layer Radio Resource Control (RRC) signaling.

In step S820, the eNB schedules the UE for each subframe. In an exemplary implementation, if a UE is scheduled, the eNB continues to schedule its E-CCH resources if configured. The E-CCH scheduling includes E-CCH aggregation level, and E-CCEs to carry the E-CCH.

In step S830, if a UE's E-CCH has been configured as localized mode based on DMRS, the eNB will configure the DMRS port according to the aggregation level of the E-CCH. If the E-CCH is of aggregation level one or two, the eNB will configure four DMRS port resources (i.e., port 7~10) in the RB which carries the E-CCH. If the E-CCH is of aggregation level four or eight, the eNB will configure two DMRS port resources (i.e., port 7~8) in the RB(s) which carries the E-CCH.

In step S840, the eNB continues to map E-CCH payload symbols to allocated E-CCEs. Rate matching is performed around the configured DMRS REs, i.e., the eNB will allocate E-CCH symbol to next available RE by skipping the DMRS REs.

In step S850, the eNB transmits the scheduled E-CCH in the subframe.

A corresponding exemplary procedure at the UE is illustrated in FIG. 8B.

In step S860, the UE first receives the configuration of its E-CCH from the eNB.

In step S870, when the UE is configured with localized mode E-CCH based on DMRS, for each subframe received, the UE first generates the search spaces for each aggregation level.

In step S880, the UE starts blind decoding for each search space. When the search space is of aggregation level one or two, the UE will assume 4 DMRS port resources are configured and no E-CCH is mapped onto those DMRS REs. When the search space is of aggregation level four or eight, the UE will assume 2 DMRS port resources are configured and no E-CCH is mapped onto those DMRS REs.

The UE decides if an E-CCH is successfully received or not after blindly decoding all the search spaces. If an E-CCH is received, the UE will perform corresponding procedures.
Exemplary Method 2: Minimal DMRS Port Configurations FIG. 6 is an illustration of DMRS configuration and E-CCE mapping of method 2 according to an exemplary embodiment of the present invention.

In another exemplary embodiment, the system will configure only the necessary number of DMRS resources for E-CCH. For the example in FIG. 3, 4 DMRS port resources are configured for case (a) and (b), and 2 DMRS port resources are configured for case (c) and (d). In cases when 4 DMRS port resources are configured, for the E-CCHs port 7 or 8 are assigned for demodulation, the eNB will assume rate matching only for two DMRS ports (ports 7~8), and perform symbol puncturing for DMRS REs for another two ports (ports 9~10), as shown in FIG. 6 for the E-CCHs port 9 or 10 are assigned for demodulation, rate matching is performed for DMRS REs for ports 9~10. In cases when 2 DMRS port resources are configured, the eNB behaves the same as what is described in method 1, and performs rate matching for the DMRS REs. Here, puncturing the E-CCH symbol means an E-CCH symbol is assign to the DMRS port 9-10 REs, but replaced by the DMRS symbol for actual transmission.

At the UE side, the UE will assume only 2 DMRS port resources are configured for E-CCH search spaces assigned with ports 7~8 regardless of their aggregation level and assume 4 DMRS port resources are configured for E-CCH search spaces assigned with ports 9~10. When an E-CCH symbol is actually punctured by a DMRS RE, the UE is unaware of the puncturing and will take the DMRS RE as a received E-CCH symbol for decoding.

Figures 9A, 9B:
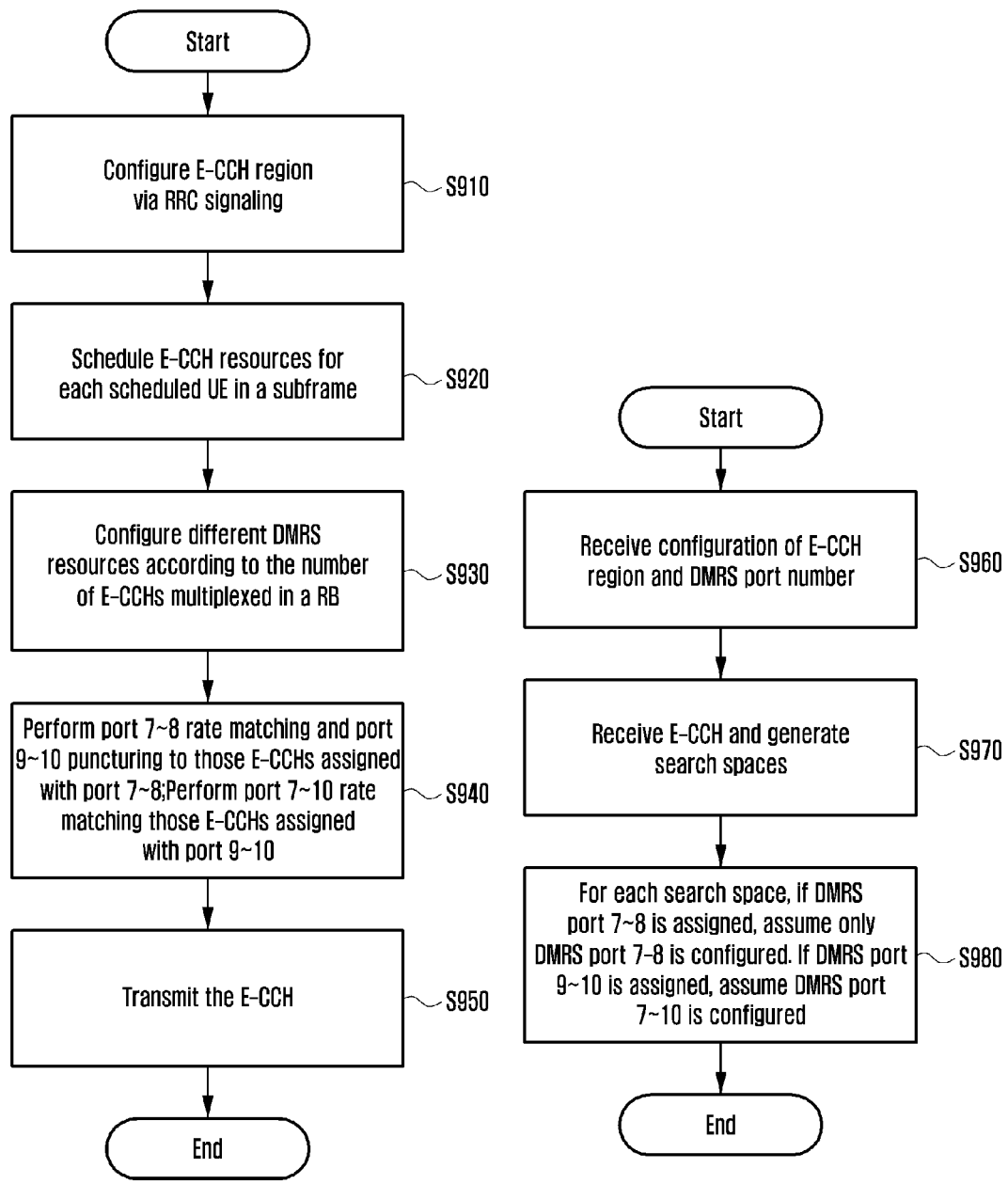
FIGS. 9A and 9B are illustrations of an eNB's and a UE's corresponding procedures according to method 2 according to an exemplary embodiment of the present invention.

FIGS. 9A and 9B are illustrations of an eNB's and a UE's corresponding procedures according to method 2 according to an exemplary embodiment of the present invention.

Referring to FIG. 9A, an eNB first configures the UE for its E-CCH configuration in step 910. In an exemplary implementation, the configuration can be part of higher layer RRC signaling.

In step 920, the eNB schedules the UE for each subframe.

If a UE is scheduled, the eNB continues to schedule its E-CCH resources if configured. The E-CCH scheduling includes E-CCH aggregation level, and E-CCEs to carry the E-CCH.

In step 930, if the UE's E-CCH has been configured as a localized mode based on DMRS, the eNB will configure a DMRS port of each E-CCH RB according to the number of E-CCHs multiplexed in the RB. If more than two E-CCHs are multiplexed, the eNB will configure four DMRS port resources (i.e., ports 7~10) in the RB which carries the E-CCH. Otherwise, the eNB will configure two DMRS port resources (i.e., ports 7~8) in the RB(s) which carries the E-CCH.

In step 940, the eNB continues to map E-CCH payload symbols to allocated E-CCEs. For an E-CCH assigned with port 7 or 8, rate matching is performed around the configured DMRS REs for ports 7~8. If ports 9~10 are also configured, the eNB will puncture corresponding E-CCH symbols which are mapped to the DMRS ports 9~10 REs. For an E-CCH assigned with port 9 or 10, rate matching is performed around the configured DMRS REs for ports 7~10.

In step 950, the eNB transmits the scheduled E-CCH in the subframe.

A corresponding exemplary procedure at the UE is illustrated in FIG. 9B.

In step 960, the UE first receives the configuration of its E-CCH from the eNB.

In step 970, when the UE is configured with localized mode E-CCH based on DMRS, for each subframe received, the UE first generates the search spaces for each aggregation level.

In step 980, the UE starts blind decoding for each search space. If the search space is assigned with port 7 or 8 for demodulation, the UE will assume 2 DMRS port resources are configured and no E-CCH is mapped onto DMRS ports 7-8 REs. The UE will also assume E-CCH symbols are transmitted on DMRS ports 9~10 REs. If the search space is assigned with port 9 or 10 for demodulation, the UE will assume 4 DMRS port resources are configured and no E-CCH is mapped onto DMRS ports 7-10 REs. The UE will also assume no E-CCH symbols are transmitted on DMRS port 9~10 REs.

The UE decides if an E-CCH is successfully received or not after blindly decoding all the search spaces. If an E-CCH is received, the UE will perform corresponding procedures.

Exemplary Method 3: DMRS Port Spreading Factor Depending on Aggregation Levels

FIG. 7 is an illustration of DMRS configuration and E-CCE mapping of method 3 according to an exemplary embodiment of the present invention.

Referring to FIG. 7, the system will configure 2 DMRS port (ports 7~8) resources for those RBs with E-CCH of aggregation level four or eight, and configure additional DMRS port (ports 11~12) resources for those RBs with at least one E-CCH of aggregation level one or two. Note that DMRS ports 11-12 use the same DMRS REs as ports 7~8. When four ports 7, 8, 11 and 12 are configured, the spreading factor of four should be assumed for DMRS based channel estimation.

For the eNB, it will always configure DMRS port resources for ports 7~8. When more than two DMRS ports are necessary, the eNB will transmit additional DMRS using ports 11 and 12. Rate matching is performed around the configured DMRS REs for E-CCH payload mapping.

At the UE side, the UE will first generate search spaces for each aggregation level. When the aggregation level of a search space is one or two, the UE will assume DMRS with a spreading factor of four for channel estimation of the RB where the search space is located. When the aggregation level of a search space is four or eight, the UE will assume DMRS with a spreading factor of two for channel estimation of the RB where the search space is located.

Figures 10A, 10B:
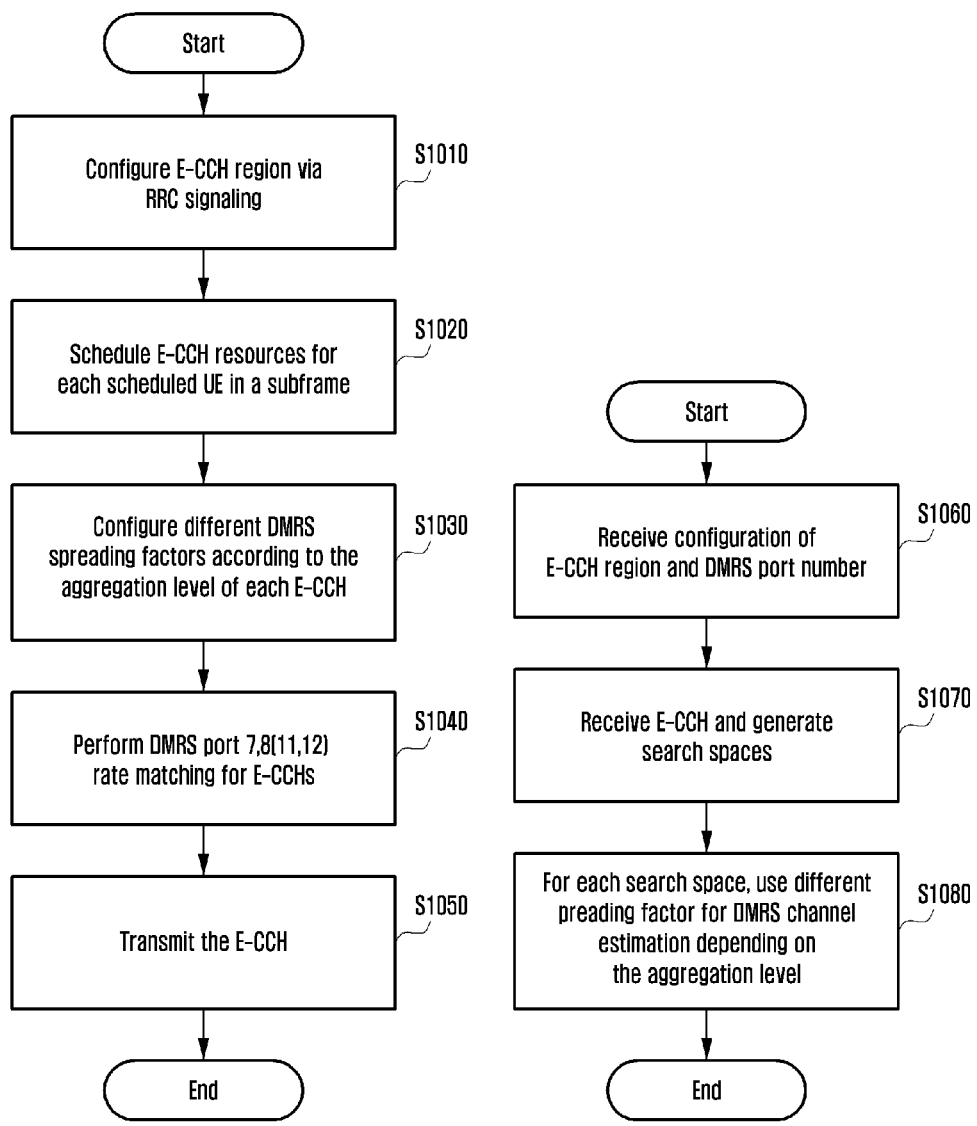
FIGS. 10A and 10B are illustrations of an eNB's and a UE's corresponding procedures of method 3 according to an exemplary embodiment of the present invention.

FIGS. 10A and 10B are illustrations of an eNB's and a UE's corresponding procedures of method 3 according to an exemplary embodiment of the present invention.

Referring to FIG. 10A, an eNB first configures the UE for its E-CCH configuration in step 1010. In an exemplary implementation, the configuration can be part of higher layer RRC signaling.

In step 1020, the eNB schedules the UE for each subframe.

If a UE is scheduled, the eNB continues to schedule its E-CCH resources if configured. The E-CCH scheduling includes E-CCH aggregation level, and E-CCEs to carry the E-CCH.

In step 1030, if a UE's E-CCH has been configured as a localized mode based on DMRS, the eNB will configure a DMRS port according to the aggregation level of the E-CCH. If more than two E-CCHs are multiplexed, the eNB will configure four DMRS port resources (i.e., port 7, 8, 11, 12) in the RB which carries the E-CCH when necessary. Otherwise, the eNB will configure two DMRS port resources (i.e., port 7~8) in the RB(s) which carries the E-CCH.

In step 1040, the eNB continues to map E-CCH payload symbols to allocated E-CCEs. Rate matching is performed around the configured DMRS REs, i.e., the eNB will allocate E-CCH symbol to next available RE by skipping the DMRS REs.

In step 1050, the eNB transmits the scheduled E-CCH in the subframe.

A corresponding exemplary procedure at the UE is illustrated in FIG. 10B.

In step 1060, the UE first receives the configuration of its E-CCH from eNB.

In step 1070, when the UE is configured with localized mode E-CCH based on DMRS, for each subframe received, the UE first generates the search spaces for each aggregation level.

In step 1080, the UE starts blind decoding for each search space. When the search space is of aggregation level one or two, the UE will assume DMRS port 7, 8, 11, 12 resources are configured with spreading factor four. When the search space is of aggregation level four or eight, the UE will assume DMRS port 7, 8 resources are configured with spreading factor two. The UE will use a corresponding spreading factor for DMRS channel estimation. The UE assumes rate matching for E-CCH for the DMRS REs, and no E-CCH is mapped onto those DMRS REs.

The UE decides if an E-CCH is successfully received or not after blindly decoding all the search spaces. If an E-CCH is received, the UE will perform corresponding procedures.

Figure 11:
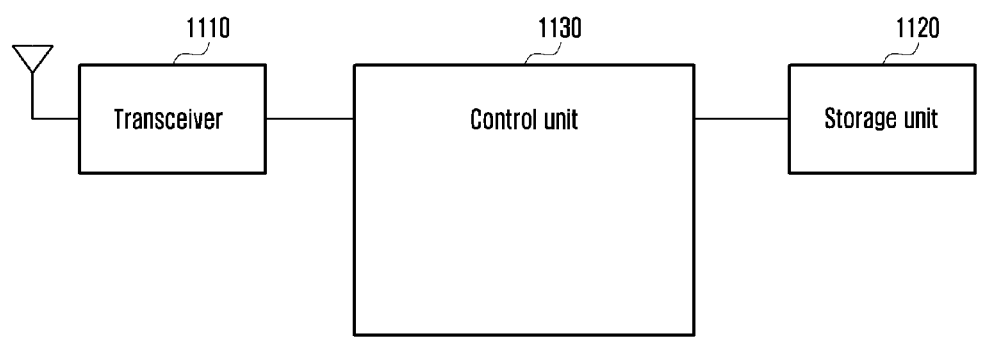
FIG. 11 is a block diagram illustrating an inner structure of a user equipment in accordance with an exemplary embodiment of the present invention.

FIG. 11 is a block diagram illustrating an inner structure of a UE in accordance with an exemplary embodiment of the present invention.

Referring to FIG. 11, the UE may include a communication unit 1110 (e.g., a transceiver), a storage unit 1120, and a control unit 1130.

The communication unit 1110 may transmit or receive a signal to or from the eNB. The signal transmitted or received to or from the eNB may include a data channel, a control channel, and the like.

The storage unit 1120 may store programs required for operation of the UE. Particularly, the storage unit 1120 may store programs that perform a series of processes for determining the size of resources allocated to the control channel depending on an aggregation level of the control channel.

The control unit 1130 controls signal flows between internal blocks of the UE to perform operations of the UE.

More particularly, the control unit 1130 controls to receive configuration information related to the control channel from the eNB, and to identify an aggregation level of the control channel. The control unit 1130 controls to determine the size of a resource that is allocated to the control channel depending on the identified aggregation level and to decode subframes received from the base station depending on results of the determination.

More particularly, if the identified aggregation level is at least one of 1 and 2, the control unit 1130 determines that resources of the control channel are the rest of resources except resources for DMRS related to all UEs capable of being scheduled among resource blocks. Additionally, if the aggregation level is either 4 or 8, the control unit 1130 determines that resources of the control channel are the rest of resources except resources for DMRS related to the UE.

Here, the control channel may be Enhanced-Physical Downlink Control CHannel (E-PDCCH).

Figure 12:
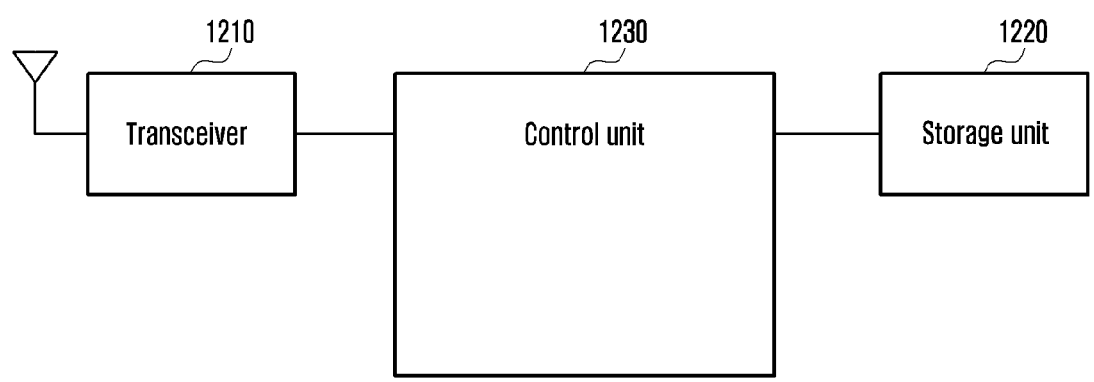
FIG. 12 is a block diagram illustrating an inner structure of an eNB in accordance with an exemplary embodiment of the present invention.

FIG. 12 is a block diagram illustrating an inner structure of an eNB in accordance with an embodiment of the present invention.

Referring to FIG. 12, the eNB may include a communication unit 1210 (e.g., a transceiver), a storage unit 1220, and a control unit 1230.

The communication unit 1210 may transmit or receive a signal to or from the UE. The signal transmitted or received to or from the UE may include a data channel or a control channel.

The storage unit 1220 may store programs required for operation of the eNB. More particularly, the storage unit 1220 may store programs that perform a series of processes for determining resources for DMRS depending on an aggregation level of control channels that will be transmitted to the UE.

The control unit 1230 controls signal flows between internal blocks of the eNB to perform operations of the eNB.

More particularly, the control unit 1230 controls to transmit configuration information of the control channel for the UE to the UE, and to generate a control channel that includes control information related to the UE scheduled in any subframe. And the control unit 1230 controls to identify the aggregation level of the generated control channel, to determine resources for a DMRS depending on the identified aggregation level, and to transmit the control channel through the determined resources to the UE.

More particularly, if the identified aggregation level is at least one of 1 and 2, the control unit 1230 determines that resources of the control channel are the rest of resources except resources for DMRS related to all UEs capable of being scheduled among resource blocks. If the aggregation level is either 4 or 8, the control unit 1230 determines that resources of the control channel are the rest of resources except resources for DMRS related to the UE.

Here, the control channel may be E-PDCCH.

According to the above-discussed exemplary embodiments of the present invention, the eNB can implicitly indicate the DMRS configuration to the UE, and the UE can determine a size and a region of the control channel allocated to itself without separate signaling. Accordingly, it is possible for the wireless communication system to use limited resources efficiently and reduce the load.

While this invention has been particularly shown and described with reference to an exemplary embodiment thereof, it will be understood by those skilled in the art that various changes in form and details may be made therein without departing from the spirit and scope of the invention as defined by the appended claims and their equivalents.

What is claimed is:

1. A method for monitoring a control channel by a user equipment in a wireless communication system, the method comprising:
   receiving configuration information on the control channel from a base station, the configuration information being received on a higher layer signaling;
   identifying a subframe in which the user equipment monitors the control channel based on the configuration information;
   determining a demodulation reference signal (DMRS) port index for monitoring the control channel depending on an aggregation level of the control channel if the control channel is configured for localized transmission; and
   monitoring the control channel in the subframe using the determined the DMRS port index.

2. The method of claim 1, wherein at least four DMRS port indices are used for monitoring the control channel if the aggregation level is 1.

3. The method of claim 1, wherein at least two DMRS port indices are used for monitoring the control channel if the aggregation level is 2.

4. The method of claim 1, wherein at least one DMRS port index is used for monitoring the control channel if the aggregation level is either 4 or 8.

5. The method of claim 1, wherein the control channel is an enhanced-physical downlink control channel (E-PDCCH).

6. The method of claim 1, wherein the configuration information on the control channel includes information on a control channel region.

7. A user equipment for monitoring a control channel in a wireless communication system, the user equipment comprising:
   a transceiver configured to transmit or receive a signal to or from a base station; and
   a processor configured to:
      receive configuration information on the control channel from the base station, the configuration information being received on a higher layer signaling,
      identify a subframe in which the user equipment monitors the control channel based on the configuration information,
      determine a demodulation reference signal (DMRS) port index for monitoring the control channel depending on an aggregation level of the control channel if the control channel is configured for localized transmission, and
      monitor the control channel in the subframe using the determined the DMRS port index.

8. The user equipment of claim 7, wherein at least four DMRS port indices are used for monitoring the control channel if the aggregation level is 1.

9. The user equipment of claim 7, wherein at least two DMRS port indices are used for monitoring the control channel if the aggregation level is 2.

10. The user equipment of claim 7, wherein at least one DMRS port index is used for monitoring the control channel if the aggregation level is either 4 or 8.

11. The user equipment of claim 7, wherein the control channel is an enhanced-physical downlink control channel (E-PDCCH).

12. The user equipment of claim 7, wherein the configuration information on the control channel includes information on a control channel region.

13. A method for transmitting a control channel by a base station in a wireless communication system, the method comprising:
- transmitting configuration information including information associated with a subframe in which a user equipment (UE) monitors the control channel to the UE, the configuration information being transmitted on a higher layer signaling; and
- transmitting the control channel in the subframe to the UE, the control channel being associated with a demodulation reference signal (DMRS) port index depending on an aggregation level of the control channel if the control channel is configured for localized transmission.

14. The method of claim 13, wherein at least four DMRS port indices are used for monitoring the control channel if the aggregation level is 1.

15. The method of claim 13, wherein at least two DMRS port indices are used for monitoring the control channel if the aggregation level is 2.

16. The method of claim 13, wherein at least one DMRS port index is used for monitoring the control channel if the aggregation level is either 4 or 8.

17. The method of claim 13, wherein the control channel is an enhanced-physical downlink control channel (E-PDCCH).

18. The method of claim 13, wherein the configuration information includes information on a control channel region.

19. A base station for transmitting a control channel in a wireless communication system, the base station comprising:
- a transceiver configured to transmit or receive a signal to or from user equipment; and
- a processor configured to:
  - transmit configuration information including information associated with a subframe in which a user equipment (UE) monitors the control channel to the UE, the configuration information being transmitted on a higher layer signaling, and
  - transmit the control channel in the subframe, the control channel being associated with a demodulation reference signal (DMRS) port index depending on an aggregation level of the control channel if the control channel is configured for localized transmission, to the UE.

20. The base station of claim 19, wherein at least four DMRS port indices are used for monitoring the control channel if the aggregation level is 1.

21. The base station of claim 19, wherein at least two DMRS port indices are used for monitoring the control channel if the aggregation level is 2.

22. The base station of claim 19, wherein at least one DMRS port index is used for monitoring the control channel if the aggregation level is either 4 or 8.

23. The base station of claim 19, wherein the control channel is an enhanced-physical downlink control channel (E-PDCCH).

24. The base station of claim 19, wherein the configuration information includes information on a control channel region.

* * * * *